Nov. 23, 1948.　　　　R. H. THIELEMANN　　　　2,454,580
METHOD OF MANUFACTURING BLADED ROTORS
Filed March 18, 1943　　　　　　　　　　　2 Sheets-Sheet 1
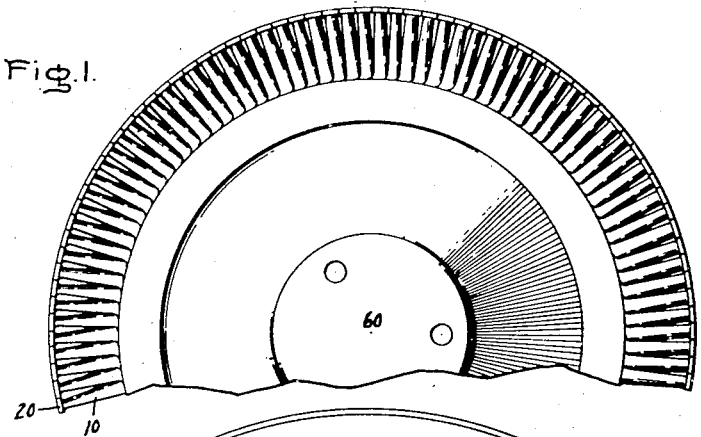
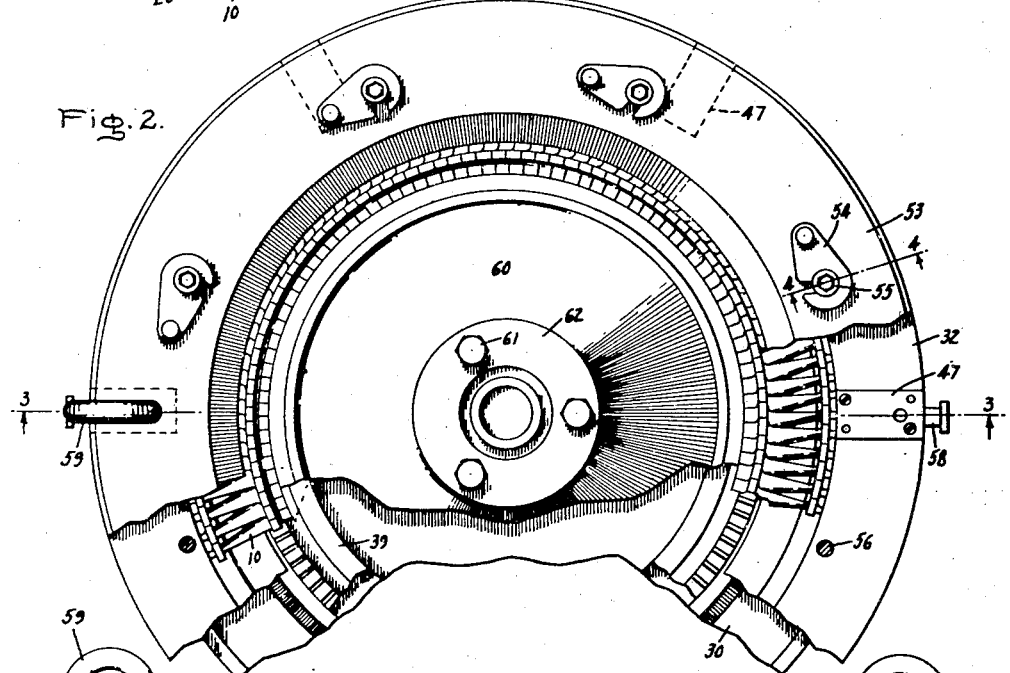
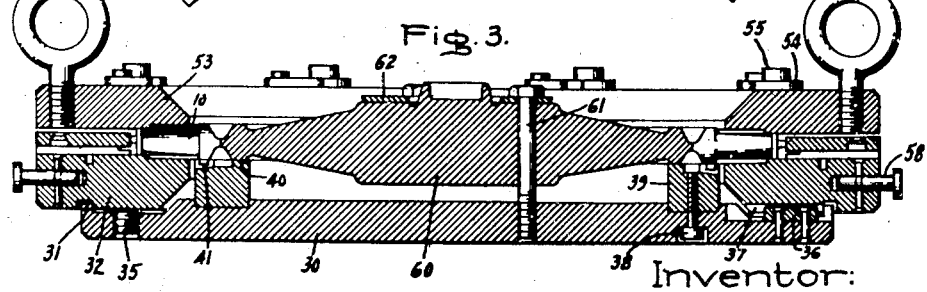
Inventor:
Rudolf H. Thielemann,
by　*Harry E. Dunham*
　　His Attorney.

Nov. 23, 1948.    R. H. THIELEMANN    2,454,580
METHOD OF MANUFACTURING BLADED ROTORS
Filed March 18, 1943    2 Sheets-Sheet 2
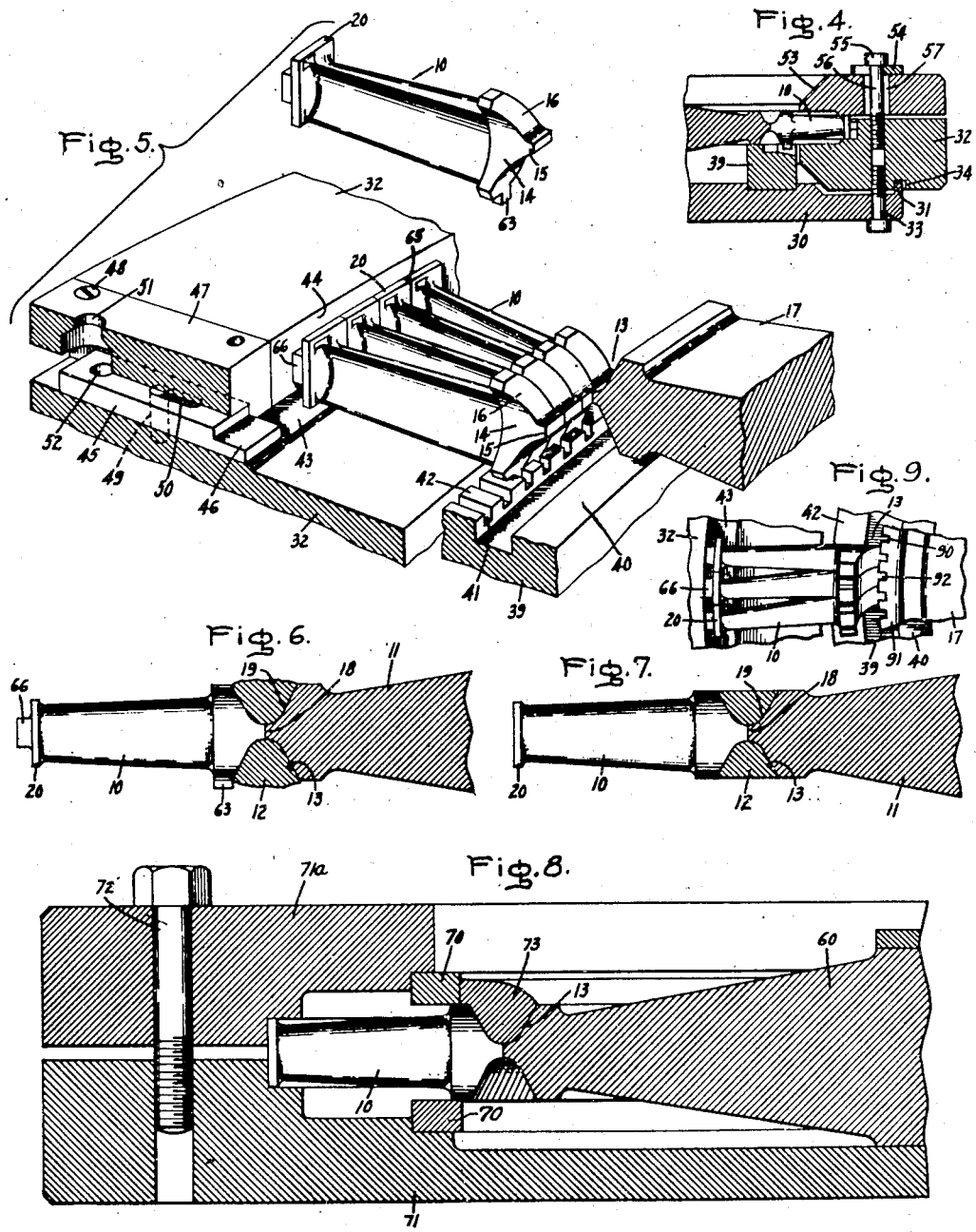
Inventor:
Rudolf H. Thielemann,
by *Harry E. Dunham*
His Attorney.

Patented Nov. 23, 1948

2,454,580

UNITED STATES PATENT OFFICE 2,454,580

METHOD OF MANUFACTURING BLADED ROTORS

Rudolf H. Thielemann, Schenectady, N. Y., assignor to General Electric Company, a corporation of New York Application March 18, 1943, Serial No. 479,549

5 Claims. (Cl. 29—156.8)

The present invention relates to a method of manufacturing bladed rotors such as are used in turbines, compressors and the like. It finds especial utility in the manufacturing of rotors for gas turbines such as, for example, turbosuperchargers wherein the rotors operate at high speeds and are subjected to high temperatures, and it is this application of my invention which I have elected to specifically illustrate and describe. It is to be understood, however, that this is only by way of example and that my invention may be used wherever found applicable.

Rotors for gas turbines may operate at speeds of the order of twenty thousand to thirty thousand revolutions per minute and at temperatures ranging from 1200° F. to 1500° F. or higher. At such speeds the centrifugal forces are high and the problem of anchoring the formed blades to the wheel rim has been a serious one. Prior to my invention, so far as I am aware, it has been the practice in the fabricating of turbine wheels for turbosuperchargers and other high speed turbine wheels to fasten or anchor the blades to the rim of the wheel by some sort of a dovetail construction. With this mechanical type of fastening the blades are provided with headed shanks fitted into transverse grooves or slots which are cut in the wheel rim. Although these wheels have been satisfactory in service, there are certain manufacturing objections to this type of construction and definite limitations in operating speeds and temperatures if the thickness and hence the weight of the wheel is to be kept at a minimum. Because of the exactness with which the dovetail connections must be made and because of difficulties of machining the alloys which must be used for such rotors and blades in order to give them the needed strength to withstand the stresses and temperatures involved, it is obvious that they are tedious and expensive to manufacture.

The advantages to be gained by being able to fabricate such a turbine wheel by welding the blades to the rim of the wheel are obvious to one who is familiar with the engineering requirements of turbine design. By having a continuous metal fastening between the blades and the wheel, all of the peripheral rim area of the wheel is utilized to carry the blade load. The best mechanical joint can utilize only 50 per cent of this peripheral rim area for this function. Thus, by welding, a thinner rim and hence a lighter wheel can be realized. Also, by eliminating the contact surfaces between the blade and the wheel that must exist with any mechanical joint, more heat can be conducted from the blades into the wheel. This is extremely desirable since the base of the blade, which is the highest stressed portion, will be considerably cooled.

Because of these many advantages to be gained by welding, it has heretofore been proposed to attach turbine blades to a wheel by welding. However, so far as I am aware, prior to my invention no wholly satisfactory construction or method had been devised for producing welded turbine wheels.

The object of my invention is to provide an improved method of manufacturing a rotor of the type described, and for a consideration of what I believe to be novel and my invention, attention is directed to the following specification and to the claims appended thereto.

In the drawings, Fig. 1 is a face view of a part of a completed turbine rotor such as may be produced by the method of my invention; Fig. 2 is a face view, with parts broken away, illustrating steps used in the manufacture of the rotor; Fig. 3 is a sectional view taken on line 3—3, Fig. 2; Fig. 4 is a view through section 4—4 of Fig. 2; Fig. 5 is a perspective view on a larger scale of parts shown in Figs. 2 and 3; Fig. 6 is a detail sectional view of a part of a rotor after welding prior to a final machine operation thereon; Fig. 7 is a detail sectional view of a completed rotor; Fig. 8 is a detail sectional view representing an important modification of my blade welding process; and Fig. 9 is a view in elevation of a still further modification.

Referring particularly to Fig. 7, the blades 10 are attached to the wheel blank 11 entirely by fused metal 12 deposited in annular grooves or pockets 13 on opposite sides of the wheel, there being no mechanical interlocking of the blade bases with the wheel rim. The pockets or annular grooves form the weld preparation. The pockets 13 are formed partly in the wheel rim and partly in the blade bases. To this end, the blade bases 14 are provided with centrally located projections 15 having curved side walls 16 and the wheel rim 17 is provided with an annular centrally located projection 18 having curved side walls 19. The curved side walls 16 and 19 are complementary whereby when a ring of buckets is assembled around the rim, there are formed the two annular pockets 13.

The fused metal may be deposited in the annular grooves or pockets 13 by any suitable welding method, either by a single pass, i. e., as a single layer, or by a plurality of passes whereby several successive layers of fused material are deposited one after another.

Each blade is provided with an integral cover section 20 or shroud, each section having a circumferential length such that in the completed wheel the sections abut each other to form a continuous blade cover or shroud band for the wheel.

In the drawing a line of demarcation is shown between the wheel rim and the blade base material and the fused metal. This is for purposes of illustration. In the finished structure, the wheel rim and blade base material will be fused together to form a unitary structure so that in substance the blades and the wheel blank are a unitary integral structure.

In Figs. 2 to 5, inclusive, I have illustrated a fixture which may be used in manufacturing a wheel in accordance with my invention. The fixture comprises a base plate 30 of suitable diameter having an annular recess in its top surface adjacent to its edge which defines a peripheral flange 31 which serves to position a lower annular clamping disk 32 which may be fastened to the base plate by a plurality of circumferentially spaced cap screws 33 (see Fig. 4). Clamping disk 32 is provided with an annular groove 34 in which flange 31 is located. In base plate 30 are spaced set screws 35 which define spaced flat surfaces against which the lower side of clamping disk 32 rests. Clamping disk 32 is positioned relatively to base plate 30 by a key 36 which is suitably attached to base plate 30 and fits in a groove 37 in the lower surface of clamping ring 32.

Attached to base plate 30 by a plurality of spaced cap screws 38 is an indexing ring 39. Indexing ring 39 is provided in its top surface with a circumferential groove which on one side defines a supporting surface 40 and on the other side provides an upstanding flange provided with indexing notches 41 and supporting surfaces 42. The upper surface of clamping ring 32 is cut away to provide a horizontal supporting surface 43 and a vertical positioning surface 44. Mounted in supporting ring 32 are a number of circumferentially spaced sliding keys 45, the inner ends 46 of which are adapted to be positioned across surface 43 or to be moved radially outward off such surface. In the present instance, six keys 45 are indicated. For convenience in manufacture, clamping ring 32 may be provided with slots in which the sliding keys are located and in which they are held by filler pieces 47 fixed in place by screws 48. Sliding movement of keys 45 is limited by pins 49 which are attached to clamping ring 32 and ride in slots 50 in the keys. The keys may be moved by means of a suitable rodlike tool which may be inserted down through openings 51 in filler pieces 47 into openings 52 in the keys, the keys being moved by a leverage action.

At 53 is an upper clamping ring adapted to be positioned above the lower clamping ring and fastened thereto by means of hooks 54 which engage under the heads 55 of studs 56 attached to lower clamping ring 32. Upper clamping ring 53 is provided with slots 57 through which studs 56 project.

On diametrically opposite sides of lower clamping plate 32 are projecting plugs 58 which may be used for the attachment of suitable hooks for lifting the fixture. Also, in upper clamping ring 53 are suitable openings in which eye bolts 59 may be screwed for use in lifting the fixture.

In constructing a wheel, the wheel blank 60 which forms the hub, web and rim of the wheel is attached to base plate 30 by bolts 61 which extend through openings in the blank and are threaded into openings in the base plate. The openings in the blank may be the openings which are afterwards utilized in attaching the completed wheel to its shaft. Preferably, there is arranged under the heads of the bolts a ring 62 against which the heads of the bolts are tightened. Indexing ring 39 is so located that the rim of the wheel rests on surface 40, as shown particularly in Figs. 3 and 5. Either prior or subsequent to attaching the blank 60 to base plate 30, lower clamping ring 32 is attached to the base plate by the cap screws 33. Next, the blades 10 are assembled around the rim of the blank 60. The bases of the blades on one side are provided with positioning projections 63 which fit into the indexing notches 41, the surfaces of the blade base adjacent the projections resting on surfaces 42. The blade cover sections 20 engage each other as is indicated at 65 as the blades are assembled around the blank. At their outer ends, the blades are provided with positioning projections 66 which fit against the vertical surface 44. The ends 46 of keys 45 are of a width equal to the width of a blade cover 20. When the blades are assembled initially, keys 45 are in positions such that ends 46 lie over surface 43. The blades are assembled in groups between the respective key ends 46. After the groups of blades, six in the present instance, have been assembled, the keys 46 are moved radially outward, one at a time, and a blade inserted in the space previously occupied by the key. In the manufacture of the blades, a plus or minus tolerance is allowed for the width of the blade cover sections, for example, a tolerance of plus or minus .0005". In assembling the blades of a group, the allowed tolerances are accumulative. When the final blades are inserted in place of the key ends 46, blades are selected having covers of a width such that they exactly fill the space left between the blade covers of the two adjacent blades between which the key end is located. By assembling the blades in groups and finally inserting what may be termed a key blade between each group, the tolerance for the blade covers does not become accumulative around the entire wheel but only for one-sixth of the circumference in the present instance and by suitable selection the workman assembling the wheel can provide an assembled structure in which the blade cover sections are firmly in engagement throughout the wheel circumference. After the blades are in place, upper clamping ring 53 is positioned and fastened down by means of hooks 54. The lower face of ring 53 is cut back so that it engages the assembled blades at the blade cover sections only. The clamping rings 32 and 53 are made relatively heavy so as to firmly clamp the blades and hold them against movement during the welding operation.

After the wheel structure has been assembled in the fixture, the fixture with the assembled structure thereon is placed in a furnace and preheated to a suitable temperature preparatory to welding. For example, it may be preheated to a temperature of the order of 600° F. At this time, the blades and fixture may be lifted and lowered into a furnace by means of the eye bolts 59 which are screwed into the openings in the clamping ring 53. After preheating, the fixture with the assembled structure therein is positioned on a suitable support and the blades welded on the one side to the blank. After the blades have been welded on the one side, the cap screws 33 and the bolts 61 are removed and the assembled structure with the clamping rings lifted off the base plate 30 and turned over. For this purpose, the projecting plugs 58 may be utilized in lifting the structure, the hooks which engage the plugs 58 serving as pivots for the structure. After the structure is turned over, the blades are welded to the blank 60 on the other side. The welding operation may be carried out complete on one side and then on the other, that is, the blades welded to the blank completely on the upper side and then turned over and welded completely on the lower side. Or, the blades may be welded to the blank on the upper side by an initial pass which partly fills the groove 13 with welding material, after which the assembled structure is reversed in position; welded on the lower side and then again reversed to complete the welding on the upper side. The welding may be performed on either side with a single pass or a plurality of passes as is well understood in connection with the welding together of structures.

Fig. 6 is a section showing the structure immediately after being welded. After the welding is completed, it is finished on opposite sides as shown in Fig. 7, the projections 63 and the excess welding material being removed and also the projections 66.

In uniting the blade bases to the rim, it is important that the fused metal be sound in every way and be free from cracks; and I have found, unless special steps are taken, that there is a tendency when the fused metal solidifies for radial cracks to form in the fused metal at the points of juncture between the blade bases. One arrangement I have discovered to avoid the formation of cracks is to utilize blades having bases so formed that the surface of demarcation between adjacent blades extends in a direction other than radial. To this end, I utilize preferably blades having transversely curved bases as shown particularly in Fig. 5. With this shape, the surface of contact between adjacent buckets is curved with respect to the axial plane of the wheel. As shown in Fig. 5, the curved face of one blade base nests into the concave face of the adjacent blade and so on around the wheel. I have found with this arrangement that when fused welding material is deposited in the annular grooves or pockets 13 it tends to solidify without the formation of cracks. This is due I believe, to one of three or all of three reasons. The first is the fact that as the fused metal is deposited and builds up outwardly from the bottom of the annular pocket 13 it does not at any time build up and solidify over a radial line of demarcation between adjacent buckets. Because the line of demarcation between blade bases is diagonal to the zone of instantaneous solidification, solid metal is always present in each radial plane, thus serving to prevent further shrinkage and consequent cracking in the deposited metal. The second reason for the substantial elimination of radial cracks with this blade shape is, I think, due to the fact that adjacent blade bases have the effect of overlapping one another. Since the heat from the deposited metal melts the overlapped bases, the bases are more effectively welded together. The degree of effective penetration of the weld is thereby increased. The third, and I believe the most important factor in eliminating the cracking results from the fact that as the deposited metal solidifies it can stand more deformation from shearing stresses without cracking than it can from tensile stresses. Since the deposited metal shrinks somewhat during solidification and cooling, circumferential strains are set up in the annular ring of deposited metal. If the surface of demarcation between adjacent blade bases is plane and radial, the deformation in the deposited metal between adjacent blade bases will result from tensile strain. With the curved base design, the surface of demarcation is not radial but at an angle to the plane of tensile strain. Hence the component of the strain taken by the solidifying metal at the line of demarcation between bases is a shearing component of strain and the deposited metal can withstand this without cracking. I regard this arrangement, wherein the blade bases are so shaped that the surfaces of demarcation between them are curved and extend at angles to a radial plane, one important feature of my invention.

To further prevent formation of cracks in the welding metal, when the weld preparation grooves 13 are filled by a single pass, I provide solid or continuous welding dam rings clamped to the blade bases on opposite sides of the wheel just beyond the outer radial edges of the grooves. These rings provide continuous walls over the blade base junctions with which the welding metal fuses. During the welding operation, the rings are welded to the blade bases and give the liquid weld deposit a continuous surface to solidify against. The rings, being continuous, serve to hold the solidified welding material, preventing formation of cracks at the blade junctions as the welding material cools and tends to shrink. In addition, the welding rings function as dams to keep liquid weld metal from flowing over into the spaces between the blades; also by welding to the metal dam rings, heat flow from the hot weld metal is more uniform, i. e. balanced in a generally radial outward and inward direction, thus insuring a more even distribution of stresses resulting from thermal contraction. By selecting a metal dam ring of suitable size, the direction of the heat flow can be controlled. This construction is illustrated in Fig. 8 wherein 70 indicates the continuous metal dam rings held in assembled relation with the wheel disk 60 and blades 10 by clamp ring 71a fixed to the base member 71 by bolts 72. On the one side, the annular pocket 13 is shown as being filled with weld metal 73, such metal being in contact and united with the adjacent upper ring 70. The method employed in constructing a complete wheel may be similar to that already described, the blades being assembled around the wheel disk, clamped in assembled positions between dam rings 70 and members 71, 71a and then welded first on the one side and then on the other. After the welding operation, the structure may be machined to size, the dam rings 70 being cut away during the machine operations resulting in a wheel structure as shown in Fig. 7.

In carrying out my invention as illustrated in Fig. 8 I may use blades having bases which are rectangular in cross section or which are curved as shown in Fig. 5.

In Fig. 9, I have shown a modification of my invention wherein for the indexing notches 41 formed in ring 39, I provide indexing notches 90 cut directly in the wheel rim projection 91, the blade bases being provided with end projections 92 located in notches 90. Otherwise, the fixture arrangement may be similar to that shown in Figs. 1 to 5 inclusive and similar parts have been designated by the same reference numerals.

What I claim as new and desire to secure by Letters Patent of the United States, is:

1. The method of manufacturing a bladed rotor having a disk and a circumferential row of buckets which consists in clamping the disk to a base plate, assembling a complete circumferential row of buckets around the rim of the disk with the bucket bases and the disk rim forming continuous annular weld preparation grooves on opposite sides of the buckets and disk and at a common radius from the center of the disk, clamping the buckets rigidly to the base plate in radially and circumferentially fixed relation to said rim by means of an annular dam member engaging the side of the buckets remote from the base plate and in heat transfer relation with the bucket bases and radially beyond the weld preparation groove on said remote side of the disk, adding to said last-named groove fused metal forming a continuous annular weld, releasing the disk and buckets from the base plate and inverting the same and clamping the disk to the base plate in said inverted position with a second dam member engaging the unwelded side of the bucket bases remote from the base plate, adding to the second groove fused metal forming a continuous annular weld, said annular welds securing the bucket bases to each other and to the rim of the disk and to the dam members whereby the dams reinforce the welds during the welding and cooling process, and machining said dam members and excess weld metal to form a desired contour.

2. In a method of manufacturing a bladed rotor having a disk and a circumferential row of buckets, the steps which consist in clamping the disk to a base plate, assembling a complete circumferential row of buckets around the rim of the disk with the bucket bases and the disk rim forming a continuous annular weld preparation groove, clamping the buckets rigidly to the base plate in radially and circumferentially fixed relation to said rim by means of an annular dam member engaging the side of the buckets remote from the base plate and in heat transfer relation with the bucket bases at a location radially beyond the weld preparation groove, adding to said groove fused metal forming a continuous annular weld securing the bucket bases to each other and to the rim of the disk and to the dam member whereby the dam reinforces the weld metal during the welding and cooling process, and subsequently machining said dam member and excess weld metal to form a desired finished contour.

3. In a method of manufacturing a bladed rotor having a disk and a circumferential row of radially extending blades, the steps which include securing the disk to a base member, assembling a plurality of blades adjacent the rim of the disk and so arranged that adjacent blade bases abut and form with the rim a weld preparation groove on the side of the disk remote from the base member, clamping the blades to the base member in fixed relation to each other and to the disk rim by means of an arcuate dam member engaging the blade bases in heat transfer relation on the side remote from the base member and radially beyond the weld preparation groove, adding to said groove fused metal securing the blade bases to each other and to the disk and to the dam member whereby the dam reinforces the weld metal during the welding and cooling process, and subsequently machining the dam and excess weld metal to form a desired contour.

4. In a method of manufacturing a bladed rotor having a disk and a circumferential row of radially extending blades, the steps which include securing the disk to a base member having an arcuate surface portion adapted to support a plurality of blades in cooperative relation with the disk, assembling a plurality of blades on the base member around the rim of the disk and arranged with adjacent blade bases in substantially abutting relation with each other and with the disk rim to form an arcuate weld preparation area, clamping the blades to the base member in fixed relation to each other and to the disk rim by means of an arcuate dam member closely engaging the blade bases in good heat transfer relation on the side remote from the base member and radially beyond the weld preparation area and having a sufficient heat capacity to conduct heat from said weld preparation area in a generally outward direction so as to balance the flow of heat inwardly into the disk, and welding the blade bases to each other and to the disk rim to form a weld in the weld preparation area, during which the dam reinforces the weld, prevents the overflow of fused metal into the inter-blade spaces, and performs said heat-flow-balancing function.

5. In a method of manufacturing a bladed rotor having a disk and a circumferential row of radially extending blades, the steps which include securing the disk to a base member, assembling a plurality of blades on the base member around the rim of the disk and arranged with adjacent blade bases in substantially abutting relation with each other and with the disk rim to form an arcuate weld preparation area, placing an arcuate dam member in good heat transfer relation with the blade bases on the side remote from the base member and radially outward from and adjacent the weld area, securing the dam member firmly against the blade bases by means of a clamp member having good heat transfer relation with the damp and having, in cooperation with said dam member, a sufficient heat capacity to provide a heat flow path in a generally outward direction from said weld preparation area substantially equivalent to that provided inwardly into the disk, and welding the blade bases to each other and to the disk rim to form a weld in the weld preparation area, during which the dam reinforces the weld, prevents the overflow of fused metal into the inter-blade spaces, and cooperates with the clamp member to balance the outward and inward flow of heat from the weld.

RUDOLF H. THIELEMANN.

REFERENCES CITED

The following references are of record in the file of this patent:

UNITED STATES PATENTS

| Number | Name | Date |
|---|---|---|
| 876,123 | Wilkinson | Jan. 7, 1908 |
| 995,517 | Barbezat | June 20, 1911 |
| 1,128,854 | Coppus | Feb. 16, 1915 |
| 1,314,806 | Hirt | Sept. 2, 1919 |
| 1,366,605 | Steenstrup | Jan. 25, 1921 |
| 1,440,395 | Ljungstrom | Jan. 2, 1935 |
| 1,470,500 | Steenstrup | Oct. 9, 1923 |
| 1,547,838 | Steenstrup | July 28, 1925 |
| 1,901,704 | Delles | Mar. 14, 1933 |
| 1,904,421 | Doran | Apr. 18, 1933 |
| 1,932,278 | Lacey | Oct. 24, 1933 |
| 1,938,382 | Haigh | Dec. 5, 1933 |
| 1,966,104 | Noack | July 10, 1934 |
| 2,110,679 | Robinson | Mar. 8, 1938 |
| 2,143,466 | Allard | Jan. 10, 1939 |
| 2,245,237 | Truex | June 10, 1941 |
| 2,264,877 | Haigh | Dec. 2, 1941 |
| 2,392,281 | Allen | Jan. 1, 1946 |

FOREIGN PATENTS

| Number | Country | Date |
|---|---|---|
| 125,790 | Sweden | May 16, 1928 |

OTHER REFERENCES

"A Practical Manual of Autogenous Welding," 2nd ed., 1914, Charles Griffin and Co., Limited, Exter St., Strand, London, England.